United States Patent
Meng

(10) Patent No.: US 9,813,159 B2
(45) Date of Patent: Nov. 7, 2017

(54) METHOD FOR SETTING MAINTENANCE ASSOCIATION MA, APPARATUS, AND SYSTEM

(71) Applicant: HUAWEI TECHNOLOGIES CO., LTD., Shenzhen (CN)

(72) Inventor: Li Meng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/152,974

(22) Filed: May 12, 2016

(65) Prior Publication Data
US 2016/0261345 A1    Sep. 8, 2016

Related U.S. Application Data

(63) Continuation of application No. PCT/CN2013/087204, filed on Nov. 15, 2013.

(51) Int. Cl.
*H04B 10/25* (2013.01)
*H04B 10/27* (2013.01)
(Continued)

(52) U.S. Cl.
CPC ......... *H04B 10/27* (2013.01); *H04L 12/4641* (2013.01); *H04L 41/08* (2013.01); *H04Q 11/0067* (2013.01)

(58) Field of Classification Search
CPC ....... H04Q 11/0067; H04Q 2011/0081; H04Q 2011/0079; H04L 43/0811; H04L 43/10;
(Continued)

(56) References Cited

U.S. PATENT DOCUMENTS 8,161,541 B2 *  4/2012  Sridhar .............. H04L 41/0604
                                                  370/242
2007/0230481 A1  10/2007  Ikeda et al.
(Continued)

FOREIGN PATENT DOCUMENTS

| CN | 101662383 | 3/2010 |
| CN | 102301648 | 12/2011 |
| CN | 103152202 | 6/2013 |

OTHER PUBLICATIONS

International Search Report and Written Opinion, dated Jul. 3, 2014, in International Application No. PCT/CN2013/087204 (11 pp.).
(Continued)

*Primary Examiner* — Don N Vo
(74) *Attorney, Agent, or Firm* — Staas & Halsey LLP

(57) ABSTRACT

The present invention relates to a method for setting a maintenance association (MA), an apparatus, and a system. A correspondence between an MA and a maintenance association end point (MEP) and a correspondence between the MEP and an optical network unit (ONU) are set on an optical line terminal (OLT), where the MA includes an MA virtual local area network VLAN, the MEP includes an MEP VLAN; and the method for setting an MA includes: sending, by the OLT, a configuration message to the ONU to which an MEP belongs, where the configuration message carries an MEP whose MEP VLAN has a valid value and an MA whose MA VLAN has an invalid value.

17 Claims, 4 Drawing Sheets

(51) Int. Cl.
*H04L 12/24* (2006.01)
*H04L 12/46* (2006.01)
*H04Q 11/00* (2006.01)

(58) Field of Classification Search
CPC . H04L 41/08; H04L 12/2898; H04L 12/4641; H04L 12/467; H04L 2012/5625; H04B 10/27
USPC .......................................................... 398/58
See application file for complete search history.

(56) References Cited

U.S. PATENT DOCUMENTS

| | | | |
|---|---|---|---|
| 2009/0094651 A1* | 4/2009 | Damm | H04L 12/1868 725/93 |
| 2010/0188983 A1 | 7/2010 | Washam et al. | |
| 2010/0247098 A1* | 9/2010 | Nesset | H04L 12/467 398/58 |
| 2012/0102148 A1* | 4/2012 | Arolovitch | H04L 12/66 709/217 |
| 2012/0140639 A1 | 6/2012 | Kao et al. | |

OTHER PUBLICATIONS

Extended European Search Report, dated Oct. 10, 2016, in European Application No. 13897460.5 (5 pp.).
*IEEE Standard for Local and metropolitan area networks—Virtual Bridged Local Area Networks Amendment 5: Connectivity Fault Management*, IEEE Std 802.1ag 2007 (pp. 1-246).
*Series G: Transmission Systems and Media, Digital Systems and Networks Digital sections and digital line system —Optical line systems for local and access networks ONU management and control interface (OMCI) specification*, ITU-T G.988 (Oct. 2012) (pp. 1-585).
International Search Report dated Jul. 3, 2014, in corresponding International Application No. PCT/CN2013/087204.

* cited by examiner

METHOD FOR SETTING MAINTENANCE ASSOCIATION MA, APPARATUS, AND SYSTEM

CROSS-REFERENCE

This application is a continuation of International Patent Application No. PCT/CN2013/087204, filed on Nov. 15, 2013, which is hereby incorporated by reference in its entirety.

TECHNICAL FIELD

The present invention relates to the field of communications technologies, and in particular, to a method for setting a maintenance association (MA), an apparatus, and a system.

BACKGROUND

A concept of an MA is defined in 802.1 ag, and the MA includes an important parameter, that is, an MA virtual local area network (VLAN). The MA corresponds to at least two maintenance association end points (MEP), an optical line terminal (OLT) respectively configures the at least two MEPs on at least two optical network units (ONU) that are connected to the OLT, so that each of the at least two devices can use the MA as a local MA. However, in an actual application scenario, different ONUs generally have different VLANs, and VLAN translation may occur on a single ONU, a single OLT, or both an ONU and an OLT. Therefore, MA VLANs of different ONUs are different, and multiple ONUs cannot use a same MA as a local MA. If the multiple ONUs use a same MA as a local MA, the OLT needs to configure multiple MAs, and then respectively send the MAs to ONUs corresponding to the MAs, causing a great amount of configuration.

SUMMARY

In view of this, the present invention provides a method for setting a maintenance association (MA) and an apparatus, so that at least two ONUs connected to an OLT can use a same MA as a local MA, thereby reducing an amount of configuration.

According to a first aspect, an embodiment of the present invention provides a method for setting a maintenance association (MA), where a correspondence between an MA and a maintenance association end point (MEP) and a correspondence between the MEP and an optical network unit (ONU) are set on an optical line terminal (OLT), where the MA includes an MA virtual local area network (VLAN), and the MEP includes an MEP VLAN; and the method includes:

sending, by the OLT, a configuration message to the ONU to which an MEP belongs, where the configuration message carries an MEP whose MEP VLAN has a valid value and an MA whose MA VLAN has an invalid value, so that the ONU to which the MEP belongs uses the MA in the configuration message as a local MA, and uses the MEP VLAN in the configuration message as a packet forwarding VLAN.

In a first possible implementation manner of the first aspect, after the sending, by the OLT, a configuration message to the ONU to which an MEP belongs, the method further includes: when the MA changes, determining, by the OLT, whether an MEP corresponding to the MA that changes exists in an ONU connected to the OLT, and sending, by the OLT, a changed MA to the ONU in which the MEP corresponding to the MA that changes exists, so that the ONU in which the MEP corresponding to the MA that changes exists uses the changed MA as a local MA.

In a second possible implementation manner of the first aspect, after the sending, by the OLT, a configuration message to the ONU to which an MEP belongs, the method further includes: when the MEP VLAN of the MEP changes, sending, by the OLT, a changed MEP VLAN to the ONU to which the MEP belongs, so that the ONU to which the MEP belongs uses the changed MEP VLAN as a packet forwarding VLAN.

According to a second aspect, an embodiment of the present invention provides a method for setting a maintenance association (MA), where the method includes:

when a maintenance association (MA) is configured on an optical line terminal (OLT) and no optical network unit (ONU) managed by the MA is configured on the OLT, sending, by the OLT, an MA configuration message to an ONU connected to the OLT, where the MA configuration message carries an MA whose MA VLAN has an invalid value, so that the ONU receiving the MA configuration message uses the MA as a local MA; and when a maintenance association end point (MEP) that corresponds to the MA and that includes an MEP virtual local area network VLAN and an ONU to which the MEP belongs are configured on the OLT, sending, by the OLT, an MEP configuration message to the ONU to which the MEP belongs, where the MEP configuration message carries an MEP whose MEP VLAN has a valid value, so that the ONU to which the MEP belongs uses the MEP VLAN in the MEP configuration message as a packet forwarding VLAN.

In a first possible implementation manner of the second aspect, after the sending, by the OLT, an MEP configuration message to the ONU to which the MEP belongs, the method further includes: when the MA changes, sending, by the OLT, a changed MA to the ONU connected to the OLT, so that the ONU receiving the changed MA uses the changed MA as a local MA.

In a second possible implementation manner of the second aspect, after the sending, by the OLT, an MEP configuration message to the ONU to which the MEP belongs, the method further includes: when the MEP VLAN of the MEP changes, sending, by the OLT, a changed MEP VLAN to the ONU to which the MEP belongs, so that the ONU to which the MEP belongs uses the changed MEP VLAN as a packet forwarding VLAN.

According to a third aspect, an embodiment of the present invention provides an optical line terminal (OLT), where the OLT includes:

a storage unit, configured to store a correspondence between an MA and a maintenance association end point (MEP) and a correspondence between the MEP and an optical network unit (ONU), where the MA includes an MA virtual local area network VLAN, and the MEP includes an MEP VLAN; and a data transmitter, configured to send a configuration message to the ONU to which an MEP belongs, where the configuration message carries an MEP whose MEP VLAN has a valid value and an MA whose MA VLAN has an invalid value, so that the ONU to which the MEP belongs uses the MA in the configuration message as a local MA, and uses the MEP VLAN in the configuration message as a packet forwarding VLAN.

In a first possible implementation manner of the third aspect, the OLT further includes: a processor, configured to: when the MA changes, determine whether an MEP corresponding to the MA that changes exists in an ONU connected to the OLT, and send a changed MA to the ONU in which the MEP corresponding to the MA that changes exists, so that the ONU in which the MEP corresponding to the MA that changes exists uses the changed MA as a local MA.

In a second possible implementation manner of the third aspect, the OLT further includes: a processor, configured to: when the MEP VLAN of the MEP changes, send a changed MEP VLAN to the ONU to which the MEP belongs, so that the ONU to which the MEP belongs uses the changed MEP VLAN as a packet forwarding VLAN.

According to a fourth aspect, an embodiment of the present invention provides an optical line terminal COLT), where the OLT includes:

a first configuring unit, configured to configure a maintenance association (MA) and configure no optical network unit (ONU) managed by the MA, where the MA includes an MA virtual local area network VLAN, and the MA VLAN has an invalid value;

a first data transmitter, configured to send an MA configuration message to an ONU connected to the OLT, where the MA configuration message carries an MA whose MA VLAN has an invalid value, so that the ONU receiving the MA configuration message uses the MA as a local MA;

a second configuring unit, configured to configure a maintenance association end point (MEP) corresponding to the MA, and configure an ONU to which the MEP belongs, where the MEP includes an MEP virtual local area network VLAN; and a second data transmitter, configured to send an MEP configuration message to the ONU to which the MEP belongs, where the MEP configuration message carries an MEP whose MEP VLAN has a valid value, so that the ONU to which the MEP belongs uses the MEP VLAN in the MEP configuration message as a packet forwarding VLAN.

In a first possible implementation manner of the fourth aspect, the OLT further includes: a processor, configured to: when the MA changes, send a changed MA to the ONU connected to the OLT, so that the ONU receiving the changed MA uses the changed MA as a local MA.

In a second possible implementation manner of the fourth aspect, the OLT further includes: a processor, configured to: when the MEP VLAN of the MEP changes, send a changed MEP VLAN to the ONU to which the MEP belongs, so that the ONU to which the MEP belongs uses the changed MEP VLAN as a packet forwarding VLAN.

According to a fifth aspect, an embodiment of the present invention provides an optical network unit (ONU), where the ONU includes:

a receiver, configured to receive a configuration message sent by an optical line terminal (OLT), where the configuration message carries an MA whose maintenance association (MA) virtual local area network VLAN has an invalid value and a maintenance association end point (MEP) whose MEP VLAN has a valid value;

a processor, configured to use the MEP VLAN in the configuration message as a packet forwarding VLAN, and perform calculation for the MEP VLAN according to a VLAN translation rule to obtain a translated packet forwarding VLAN; and a forwarder, configured to use the packet forwarding VLAN and the translated packet forwarding VLAN to forward a packet.

According to a sixth aspect, an embodiment of the present invention provides a system for setting a maintenance association (MA), including: an optical line terminal (OLT) and an optical network unit (ONU), where a correspondence between an MA and a maintenance association end point (MEP) and a correspondence between the MEP and the ONU are set on the OLT, the MA includes an MA virtual local area network VLAN, and the MEP includes an MEP VLAN, where the OLT is configured to send a configuration message to the ONU to which an MEP belongs, where the configuration message carries an MEP whose MEP VLAN has a valid value and an MA whose MA VLAN has an invalid value; and the ONU is configured to use the MA in the configuration message as a local MA, and use the MEP VLAN in the configuration message as a packet forwarding VLAN.

In a first possible implementation manner of the sixth aspect, the OLT is further configured to: when the MA changes, determine whether an MEP corresponding to the MA that changes exists in an ONU connected to the OLT, and send a changed MA to the ONU in which the MEP corresponding to the MA that changes exists; and the ONU is further configured to use the changed MA as a local MA.

In a second possible implementation manner of the sixth aspect, the OLT is further configured to: when the MEP VLAN of the MEP changes, send a changed MEP VLAN to the ONU to which the MEP belongs; and the ONU is further configured to use the changed MEP VLAN as a packet forwarding VLAN.

In a third possible implementation manner of the sixth aspect, the ONU is further configured to perform calculation for the MEP VLAN according to a VLAN translation rule to obtain a translated VLAN, and when VLAN translation occurs, use the obtained translated VLAN as a packet forwarding VLAN.

According to the solutions described above, a correspondence between an MA and an MEP and a correspondence between the MEP and an ONU are set on an OLT, where the MA includes an MA VLAN, and the MEP includes an MEP VLAN; and the OLT sends a configuration message to the ONU to which an MEP belongs, where the configuration message carries an MEP whose MEP VLAN has a valid value and an MA whose MA VLAN has an invalid value, so that the ONU to which the MEP belongs uses the MA in the configuration message as a local MA, and uses the MEP VLAN in the configuration message as a packet forwarding VLAN. Because the MA VLAN of the MA has an invalid value, each ONU connected to the OLT can use the MA as a local MA, thereby effectively reducing an amount of configuration.

DESCRIPTION OF EMBODIMENTS

To make the objectives, technical solutions, and advantages of the present invention clearer, the following further describes the present invention in detail with reference to the accompanying drawings. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
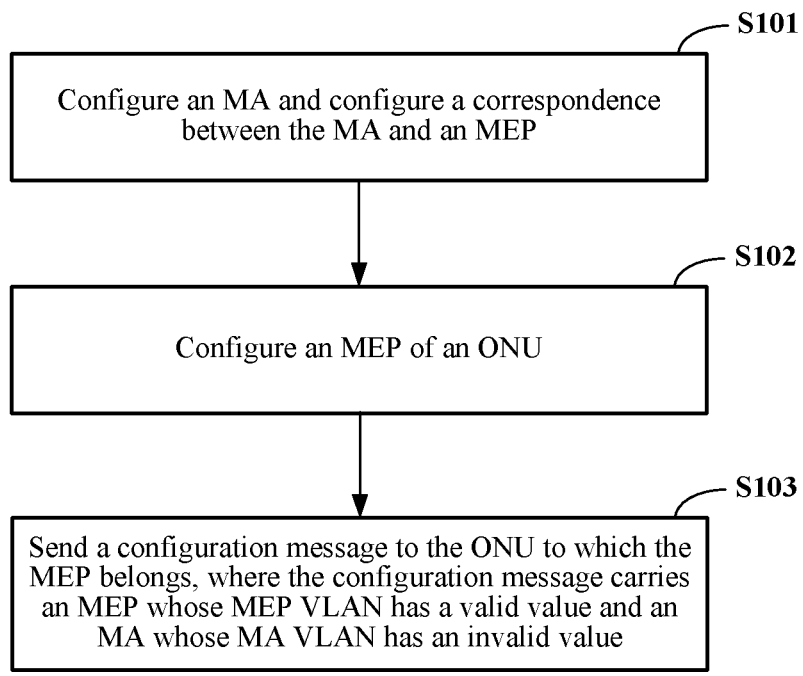
FIG. 1 is a schematic flowchart of a method for setting an MA according to Embodiment 1 of the present invention.

A method for setting an MA provided in Embodiment 1 of the present invention is described in detail below by using FIG. 1 as an example. FIG. 1 is a schematic flowchart of the method for setting an MA according to Embodiment 1 of the present invention. The method for setting an MA is executed by an OLT, and the method for setting an MA is applicable to a scenario in which an ONU is used as an MEP, or a scenario in which an ONU is used as an MEP and also used as a maintenance association intermediate point (MIP).

As shown in FIG. 1, the method for setting an MA includes the following steps:

Step S101: Configure an MA and configure a correspondence between the MA and an MEP.

An MA VLAN of the MA has an invalid value, for example, the MA VLAN is set to 0.

Specifically, when an MA is configured, no ONU managed by the MA is configured, and an MA VLAN is set to 0, so that each ONU connected to the OLT can use the MA as a local MA. After the MA is configured, the MA is not sent to an ONU, and step S102 is directly performed.

Step S102: Configure an MEP of an ONU.

An MEP VLAN of the MEP has a valid value.

Step S103: Send a configuration message to the ONU to which the MEP belongs, where the configuration message carries an MEP whose MEP VLAN has a valid value and an MA whose MA VLAN has an invalid value.

After receiving the configuration message, the ONU uses the MA as a local MA, uses the MEP VLAN of the MEP as a forwarding VLAN, and then calculates a translated VLAN of the MEP VLAN according to a VLAN translation rule.

When the ONU performs packet forwarding, in an upstream direction, the ONU receives a packet carrying the MEP VLAN, changes the MEP VLAN carried by the packet to the translated VLAN, and then sends the packet carrying the translated VLAN; and in a downstream direction, the ONU receives a packet carrying the translated VLAN, changes the translated VLAN carried by the packet to the MEP VLAN, and then sends the packet carrying the MEP VLAN, thereby implementing packet forwarding.

Specifically, an MA VLAN has two main functions: a first one is the MA VLAN being used as a forwarding VLAN, which is carried when a packet is sent, and a second one is the MA VLAN being used for generating an MIP. As a terminal device, an ONU is generally used as an MEP. For an ONU used as an MEP, the MA VLAN only plays the role of a forwarding VLAN. When a parameter of the MEP includes an MEP VLAN, the MEP VLAN may be directly used as a forwarding VLAN. Therefore, in a scenario in which an ONU is used as an MEP, an MA VLAN actually does not perform a function. To enable an ONU to use an MEP VLAN as a forwarding VLAN, modifications and supplements need to be made to 802.1 ag.

Specific content of the modifications and supplements made to 802.1 ag is: (1) When VLAN translation does not occur on an ONU, an MEP VLAN needs to be one of members in an MA VLAN list; and when VLAN translation occurs on an ONU, an MEP VLAN may be different from an MA VLAN. (2) When an MA VLAN is 0 and an MEP VLAN has a valid value, an MEP in a downstream direction uses the MEP VLAP to send a packet, and an MEP in an upstream direction uses a translated VLAN of the MEP VLAN to send a packet. This ensures that an ONU can use an MEP VLAN included in an MEP as a forwarding VLAN.

Because the MA VLAN of the MA received by the ONU has an invalid value and the MEP VLAN of the MEP received by the ONU has a valid value, according to the modified and supplemented 802.1 ag, the ONU can use the MEP VLAN of the MEP as a forwarding VLAN.

It should be noted that step S101 needs to be performed only once, and then step S102 and step S103 are performed for different MEPs. In this way, each ONU connected to the OLT can use the MA as a local MA, and in a case in which the MA VLAN has an invalid value, the ONU can forward a packet normally.

In addition, the method for setting an MA provided in Embodiment 1 of the present invention further includes: a process of modifying the MA, modifying the MEP, and deleting the MEP.

Specifically, when the MA changes, that is, any parameter included in parameters of the MA changes, the OLT determines whether an MEP corresponding to the MA that changes exists in an ONU connected to the OLT, and sends a changed MA to the ONU in which the MEP corresponding to the MA that changes exists, so that the ONU in which the MEP corresponding to the MA that changes exists uses the changed MA as a local MA.

When the MEP VLAN of the MEP changes, the OLT sends a changed MEP VLAN to the ONU to which the MEP belongs, so that the ONU of the MEP uses the changed MEP VLAN as a packet forwarding VLAN.

When the MEP is deleted, a message for deleting the MEP is sent to the ONU to which the MEP belongs, to delete the MEP from the ONU to which the MEP belongs; and it is determined whether another MEP exists in the ONU, and if no MEP exists in the ONU, a message for deleting the MA is sent to the ONU, to delete the MA from the ONU.

In the method for setting an MA provided in Embodiment 1 of the present invention, a correspondence between an MA and an MEP and a correspondence between the MEP and an ONU are set on an OLT, where the MA includes an MA VLAN, and the MEP includes an MEP VLAN; and the OLT sends a configuration message to the ONU to which an MEP belongs, where the configuration message carries an MEP whose MEP VLAN has a valid value and an MA whose MA VLAN has an invalid value, so that the ONU to which the MEP belongs uses the MA in the configuration message as a local MA, and uses the MEP VLAN in the configuration message as a packet forwarding VLAN. Because the MA VLAN of the MA has an invalid value, each ONU connected to the OLT can use the MA as a local MA, thereby effectively reducing an amount of configuration.

Figure 2:
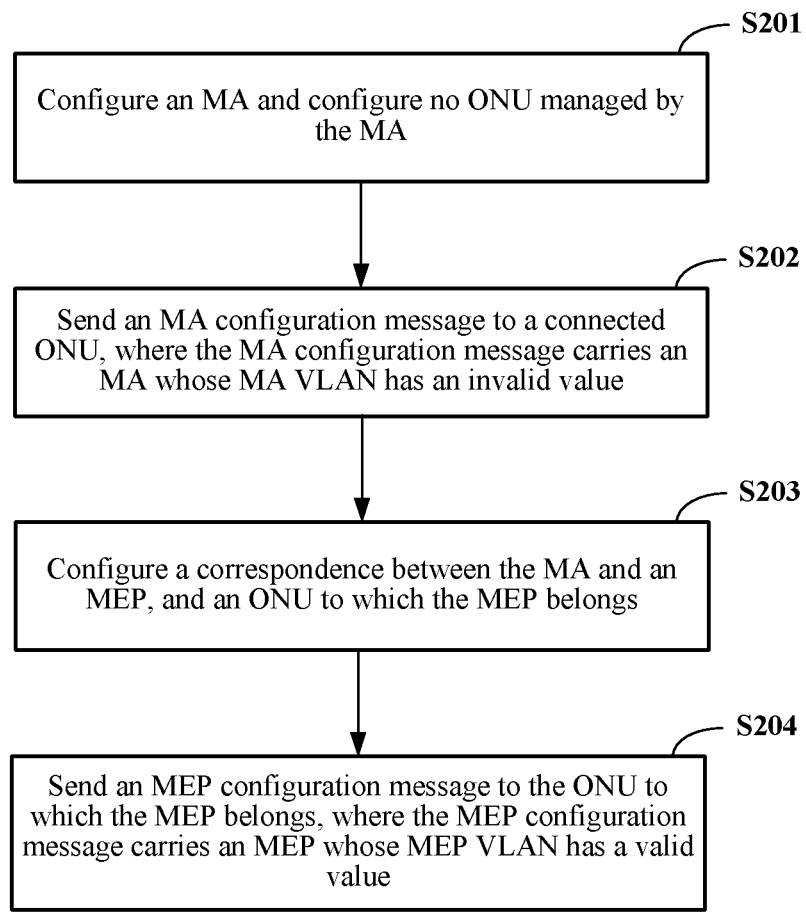
FIG. 2 is a schematic flowchart of a method for setting an MA according to Embodiment 2 of the present invention.

A method for setting an MA provided in Embodiment 2 of the present invention is described in detail below by using FIG. 2 as an example. FIG. 2 is a schematic flowchart of the method for setting an MA according to Embodiment 2 of the present invention. The method for setting an MA is executed by an OLT, and the method for setting an MA is applicable to a scenario in which an ONU is used as an MEP, or a scenario in which an ONU is used as an MEP and also used as an MIP.

As shown in FIG. 2, the method for setting an MA includes the following steps:

Step S201: Configure an MA and configure no ONU managed by the MA.

An MA VLAN of the MA has an invalid value, for example, the MA VLAN is set to 0.

Specifically, when an MA is configured, no ONU managed by the MA is configured, and an MA VLAN is set to 0, so that each ONU connected to the OLT can use the MA as a local MA.

Step S202: Send an MA configuration message to a connected ONU, where the MA configuration message carries an MA whose MA VLAN has an invalid value.

Because the MA VLAN of the MA has an invalid value, each ONU receiving the MA configuration message can use the MA as a local MA.

Step S203: Configure a correspondence between the MA and an MEP, and an ONU to which the MEP belongs.

An MEP VLAN of the MEP has a valid value.

Step S204: Send an MEP configuration message to the ONU to which the MEP belongs, where the MEP configuration message carries an MEP whose MEP VLAN has a valid value.

After receiving the MEP configuration message, the ONU uses the MEP VLAN of the MEP as a forwarding VLAN, and then calculates a translated VLAN of the MEP VLAN according to a VLAN translation rule.

When the ONU performs packet forwarding, in an upstream direction, the ONU receives a packet carrying the MEP VLAN, changes the MEP VLAN carried by the packet to the translated VLAN, and then sends the packet carrying the translated VLAN; and in a downstream direction, the ONU receives a packet carrying the translated VLAN, changes the translated VLAN carried by the packet to the MEP VLAN, and then sends the packet carrying the MEP VLAN, thereby implementing packet forwarding.

Specifically, an MA VLAN has two main functions: a first one is the MA VLAN being used as a forwarding VLAN, which is carried when a packet is sent, and a second one is the MA VLAN being used for generating an MIP. As a terminal device, an ONU is generally used as an MEP. For an ONU used as an MEP, the MA VLAN only plays the role of a forwarding VLAN. When a parameter of the MEP includes an MEP VLAN, the MEP VLAN may be directly used as a forwarding VLAN. Therefore, in a scenario in which an ONU is used as an MEP, an MA VLAN actually does not perform a function. To enable an ONU to use an MEP VLAN as a forwarding VLAN, modifications and supplements need to be made to 802.1ag.

Specific content of the modifications and supplements made to 802.1ag is: (1) When VLAN translation does not occur on an ONU, an MEP VLAN needs to be one of members in an MA VLAN list; and when VLAN translation occurs on an ONU, an MEP VLAN may be different from an MA VLAN. (2) When an MA VLAN is 0 and an MEP VLAN has a valid value, an MEP in a downstream direction uses the MEP VLAP to send a packet, and an MEP in an upstream direction uses a translated VLAN of the MEP VLAN to send a packet. This ensures that an ONU can use an MEP VLAN included in an MEP as a forwarding VLAN.

Because the MA VLAN of the MA received by the ONU has an invalid value and the MEP VLAN of the MEP received by the ONU has a valid value, according to the modified and supplemented 802.1ag, the ONU can use the MEP VLAN of the MEP as a forwarding VLAN.

It should be noted that step S201 and step S202 need to be performed only once, and then step S203 and step S204 are performed for different MEPs. In this way, each ONU connected to the OLT can use the MA as a local MA, and in a case in which the MA VLAN has an invalid value, the ONU can forward a packet normally.

In addition, the method for setting an MA provided in Embodiment 2 of the present invention further includes: a process of modifying the MA, modifying the MEP, deleting the MEP, and deleting the MA.

Specifically, when the MA changes, the OLT sends a changed MA to the ONU connected to the OLT, so that the ONU receiving the changed MA uses the changed MA as a local MA; and when the MEP VLAN of the MEP changes, the OLT sends a changed MEP VLAN to the ONU to which the MEP belongs, so that the ONU to which the MEP belongs uses the changed MEP VLAN as a packet forwarding VLAN.

When the MEP is deleted, a message for deleting the MEP is sent to the ONU to which the MEP belongs, to delete the MEP from the ONU.

When the MA is deleted, a message for deleting an MEP is sent to the ONU connected to the OLT, to delete the MEP from the ONU connected to the OLT; and when no MEP exists in the ONU connected to the OLT, a message for deleting the MA is sent to the ONU connected to the OLT, to delete the MA from the ONU connected to the OLT.

In the method for setting an MA provided in Embodiment 2 of the present invention, when an MA is configured on an OLT and no optical network unit (ONU) managed by the MA is configured on the OLT, the OLT sends an MA configuration message to an ONU connected to the OLT, where the MA configuration message carries an MA whose MA VLAN has an invalid value, so that the ONU receiving the MA configuration message uses the MA as a local MA; and when an MEP that corresponds to the MA and that includes an MEP VLAN and an ONU to which the MEP belongs are configured on the OLT, the OLT sends an MEP configuration message to the ONU to which the MEP belongs, where the MEP configuration message carries an MEP whose MEP VLAN has a valid value, so that the ONU to which the MEP belongs uses the MEP VLAN in the MEP configuration message as a packet forwarding VLAN. Because the MA VLAN of the MA has an invalid value, each ONU connected to the OLT can use the MA as a local MA, thereby effectively reducing an amount of configuration.

Figure 3:
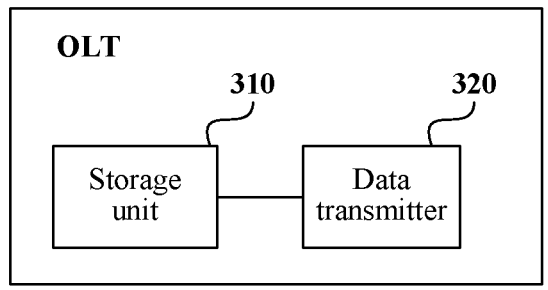
FIG. 3 is a schematic diagram of a structure of an OLT according to Embodiment 3 of the present invention.

An OLT provided in the Embodiment 3 of the present invention is described in detail below by using FIG. 3 as an example. FIG. 3 is a schematic diagram of a structure of the OLT according to Embodiment 3 of the present invention. The OLT is configured to implement the method for setting an MA provided in Embodiment 1 of the present invention.

As shown in FIG. 3, the OLT includes: a storage unit 310, and a data transmitter 320, where the storage unit 310 is configured to store a correspondence between an MA and an MEP and a correspondence between the MEP and an ONU, where the MA includes an MA VLAN, and the MEP includes an MEP VLAN; and the data transmitter 320 is configured to send a configuration message to the ONU to which an MEP belongs, where the configuration message carries an MEP whose MEP VLAN has a valid value and an MA whose MA VLAN has an invalid value, so that the ONU to which the MEP belongs uses the MA in the configuration message as a local MA, and uses the MEP VLAN in the configuration message as a packet forwarding VLAN.

Figure 4:
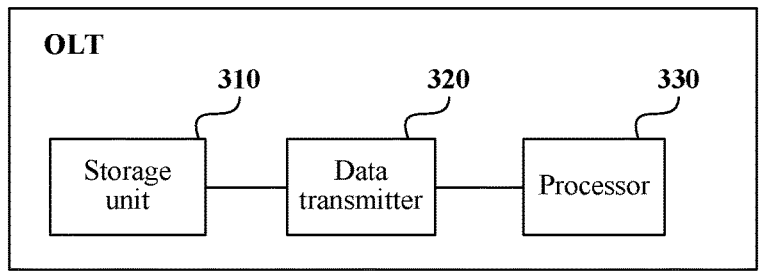
FIG. 4 is a schematic diagram of a structure of another OLT according to Embodiment 3 of the present invention.

As shown in FIG. 4, the OLT provided in Embodiment 3 of the present invention may further include: a processor 330, where the processor 330 is configured to: when the MA changes, determine whether an MEP corresponding to the MA that changes exists in an ONU connected to the OLT, and send a changed MA to the ONU in which the MEP corresponding to the MA that changes exists, so that the ONU in which the MEP corresponding to the MA that changes exists uses the changed MA as a local MA.

The processor 330 is further configured to: when the MEP VLAN of the MEP changes, send a changed MEP VLAN to the ONU to which the MEP belongs, so that the ONU to which the MEP belongs uses the changed MEP VLAN as a packet forwarding VLAN.

The processor 330 is further configured to: when the MEP is deleted, send a message for deleting the MEP to the ONU to which the MEP belongs, to delete the MEP from the ONU to which the MEP belongs; and determine whether another MEP exists in the ONU, and if no MEP exists in the ONU, send a message for deleting the MA to the ONU, to delete the MA from the ONU.

In the OLT provided in Embodiment 3 of the present invention, a correspondence between an MA and an MEP and a correspondence between the MEP and an ONU are set on the OLT, where the MA includes an MA VLAN, and the MEP includes an MEP VLAN; and the OLT sends a configuration message to the ONU to which an MEP belongs, where the configuration message carries an MEP whose MEP VLAN has a valid value and an MA whose MA VLAN has an invalid value, so that the ONU to which the MEP belongs uses the MA in the configuration message as a local MA, and uses the MEP VLAN in the configuration message as a packet forwarding VLAN. Because the MA VLAN of the MA has an invalid value, each ONU connected to the OLT can use the MA as a local MA, thereby effectively reducing an amount of configuration.

Figure 5:
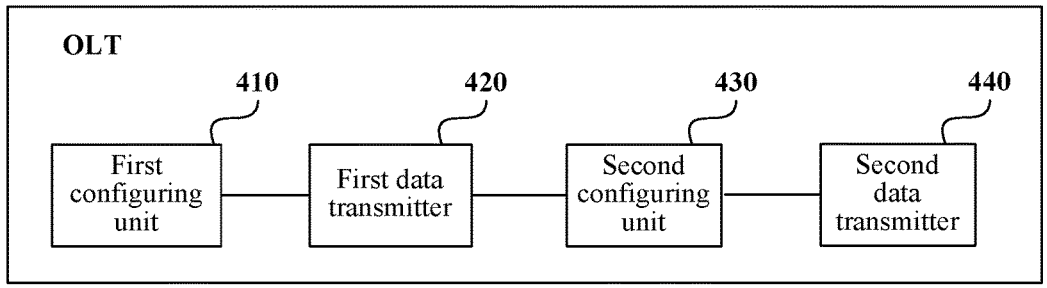
FIG. 5 is a schematic diagram of a structure of an OLT according to Embodiment 4 of the present invention.

An OLT provided in the Embodiment 4 of the present invention is described in detail below by using FIG. 5 as an example. FIG. 5 is a schematic diagram of a structure of the OLT according to Embodiment 4 of the present invention. The OLT is configured to implement the method for setting an MA provided in Embodiment 2 of the present invention.

As shown in FIG. 5, the OLT includes: a first configuring unit 410, a first data transmitter 420, a second configuring unit 430, and a second data transmitter 440, where the first configuring unit 410 is configured to configure an MA and configure no ONU managed by the MA, where the MA includes an MA VLAN, and the MA VLAN has an invalid value;

the first data transmitter is configured to send an MA configuration message to an ONU connected to the OLT, where the MA configuration message carries an MA whose MA VLAN has an invalid value, so that the ONU receiving the MA configuration message uses the MA as a local MA;

the second configuring unit is configured to configure an MEP corresponding to the MA, and configure an ONU to which the MEP belongs, where the MEP includes an MEP VLAN; and the second data transmitter is configured to send an MEP configuration message to the ONU to which the MEP belongs, where the MEP configuration message carries an MEP whose MEP VLAN has a valid value, so that the ONU to which the MEP belongs uses the MEP VLAN in the MEP configuration message as a packet forwarding VLAN.

Figure 6:
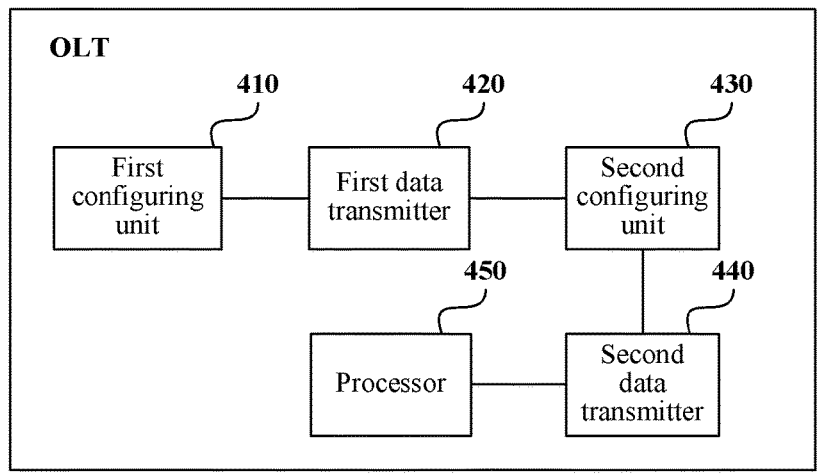
FIG. 6 is a schematic diagram of a structure of another OLT according to Embodiment 4 of the present invention.

As shown in FIG. 6, the OLT provided in Embodiment 4 of the present invention may further include: a processor 450, where the processor 450 is configured to: when the MA changes, send a changed MA to the ONU connected to the OLT, so that the ONU receiving the changed MA uses the changed MA as a local MA.

The processor 450 is further configured to: when the MEP VLAN of the MEP changes, send a changed MEP VLAN to the ONU to which the MEP belongs, so that the ONU to which the MEP belongs uses the changed MEP VLAN as a packet forwarding VLAN.

The processor 450 is further configured to: when the MEP is deleted, send a message for deleting the MEP to the ONU to which the MEP belongs, to delete the MEP from the ONU.

The processor 450 is further configured to: when the MA is deleted, send a message for deleting an MEP to the ONU connected to the OLT, to delete the MEP from the ONU connected to the OLT; and when no MEP exists in the ONU connected to the OLT, send a message for deleting the MA to the ONU connected to the OLT, to delete the MA from the ONU connected to the OLT.

In the OLT provided in Embodiment 4 of the present invention, when an MA is configured on the OLT and no optical network unit (ONU) managed by the MA is configured on the OLT, the OLT sends an MA configuration message to an ONU connected to the OLT, where the MA configuration message carries an MA whose MA VLAN has an invalid value, so that the ONU receiving the MA configuration message uses the MA as a local MA; and when an MEP that corresponds to the MA and that includes an MEP VLAN and an ONU to which the MEP belongs are configured on the OLT, the OLT sends an MEP configuration message to the ONU to which the MEP belongs, where the MEP configuration message carries an MEP whose MEP VLAN has a valid value, so that the ONU to which the MEP belongs uses the MEP VLAN in the MEP configuration message as a packet forwarding VLAN. Because the MA VLAN of the MA has an invalid value, each ONU connected to the OLT can use the MA as a local MA, thereby effectively reducing an amount of configuration.

Figure 7:
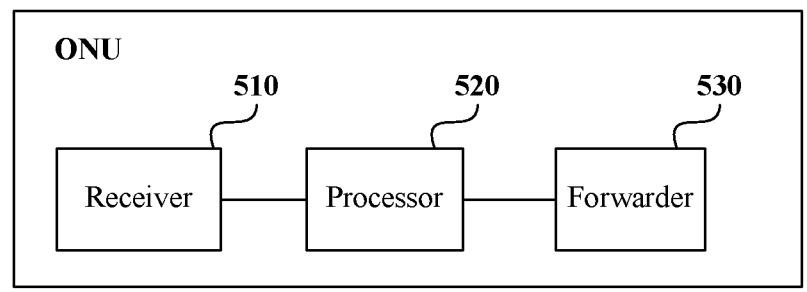
FIG. 7 is a schematic diagram of a structure of an ONU according to Embodiment 5 of the present invention.

An ONU provided in the Embodiment 5 of the present invention is described in detail below by using FIG. 7 as an example FIG. 7 is a schematic diagram of a structure of the ONU according to Embodiment 5 of the present invention.

The ONU includes: a receiver 510, a processor 520, and a forwarder 530.

The receiver 510 is configured to receive a configuration message sent by an OLT, where the configuration message carries an MA whose MA VLAN has an invalid value and an MEP whose MEP VLAN has a valid value.

The processor 520 is configured to use the MEP VLAN in the configuration message as a packet forwarding VLAN, and perform calculation for the MEP VLAN according to a VLAN translation rule to obtain a translated packet forwarding VLAN.

Specifically, when the MEP is configured on an ONU user-side port, the VLAN translation rule is consistent with a VLAN translation rule of an upstream packet that is received by the ONU user-side port and that carries a VLAN identity (ID) that is equal to the MEP VLAN, where the upstream packet is a Dynamic Host Configuration Protocol (DHCP) packet, an Internet Group Management Protocol (IGMP) packet, or the like, and when the MEP is configured on an ONU network-side port, the VLAN translation rule is that no translation is performed, that is, the translated VLAN is still the MEP VLAN.

The forwarder 530 is configured to use the packet forwarding VLAN and the translated packet forwarding VLAN to forward a packet.

Specifically, in an upstream direction, the forwarder 530 receives a packet carrying the MEP VLAN, changes the MEP VLAN carried by the packet to the translated VLAN, and then sends the packet carrying the translated VLAN; and in a downstream direction, the forwarder 530 receives a packet carrying the translated VLAN, changes the translated VLAN carried by the packet to the MEP VLAN, and then sends the packet carrying the MEP VLAN, thereby implementing packet forwarding.

In the ONU provided in Embodiment 5 of the present invention, the ONU receives an MA whose MA VLAN has an invalid value, and receives an MEP whose MEP VLAN has a valid value. Therefore, the ONU can use the MA as a local MA, use the MEP VLAN of the MEP as a forwarding VLAN, and calculate a translated VLAN of the MEP VLAN, to implement packet forwarding.

Figure 8:
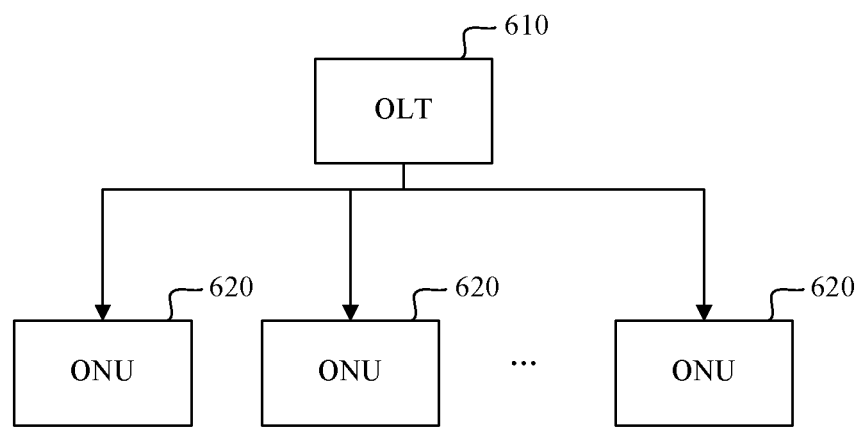
FIG. 8 is a schematic diagram of a structure of a system for setting an MA according to Embodiment 6 of the present invention.

A system for setting an MA provided in Embodiment 6 of the present invention is described in detail below by using FIG. 8 as an example FIG. 8 is a schematic diagram of a structure of the system for setting an MA according to Embodiment 6 of the present invention.

As shown in FIG. 8, the system for setting an MA includes: an OLT 610, and an ONU 620, where a correspondence between an MA and an MEP and a correspondence between the MEP and an ONU are set on the OLT 610, where the MA includes an MA VLAN, and the MEP includes an MEP VLAN, where the OLT 610 is configured to send a configuration message to the ONU to which an MEP belongs, where the configuration message carries an MEP whose MEP VLAN has a valid value and an MA whose MA VLAN has an invalid value; and the ONU 620 is configured to use the MA in the configuration message as a local MA, and use the MEP VLAN in the configuration message as a packet forwarding VLAN.

The OLT 610 is further configured to: when the MA changes, determine whether an MEP corresponding to the MA that changes exists in the ONU 620 connected to the OLT 610, and send a changed MA to the ONU 620 in which the MEP corresponding to the MA that changes exists; and the ONU 620 is further configured to use the changed MA as a local MA.

The OLT 610 is further configured to: when the MEP VLAN of the MEP changes, send a changed MEP VLAN to the ONU 620 to which the MEP belongs; and the ONU 620 is further configured to use the changed MEP VLAN as a packet forwarding VLAN.

The ONU 620 is further configured to perform calculation for the MEP VLAN according to a VLAN translation rule to obtain a translated VLAN, and when VLAN translation occurs, use the obtained translated VLAN as a packet forwarding VLAN.

In the system for setting an MA provided in Embodiment 6 of the present invention, a correspondence between an MA and an MEP and a correspondence between the MEP and an ONU are set on an OLT, where the MA includes an MA VLAN, and the MEP includes an MEP VLAN; and the OLT sends a configuration message to the ONU to which an MEP belongs, where the configuration message carries an MEP whose MEP VLAN has a valid value and an MA whose MA VLAN has an invalid value, so that the ONU to which the MEP belongs uses the MA in the configuration message as a local MA, and uses the MEP VLAN in the configuration message as a packet forwarding VLAN. Because the MA VLAN of the MA has an invalid value, each ONU connected to the OLT can use the MA as a local MA, thereby effectively reducing an amount of configuration.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may be configured in a random access memory (RAM), a memory, a read-only memory (ROM), an electrically programmable ROM, an electrically erasable programmable ROM, a register, a hard disk, a removable disk, a CD-ROM, or a storage medium in any other forms well-known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A method for setting a maintenance association (MA), wherein a correspondence between a maintenance association (MA) and a maintenance association end point (MEP) and a correspondence between the MEP and an optical network unit (ONU) are set on an optical line terminal (OLT), wherein the MA comprises an MA virtual local area network (VLAN), and the MEP comprises an MEP VLAN; and the method comprises:

sending, by the OLT, a configuration message to the ONU to which an MEP belongs, wherein the configuration message carries an MEP whose MEP VLAN has a valid value and an MA whose MA VLAN has an invalid value, so that the ONU to which the MEP belongs uses the MA in the configuration message as a local MA, and uses the MEP VLAN in the configuration message as a packet forwarding VLAN.

2. The method according to claim 1, wherein after the sending, by the OLT, a configuration message to the ONU to which an MEP belongs, the method further comprises:

when the MA changes, determining, by the OLT, whether an MEP corresponding to the MA that changes exists in an ONU connected to the OLT; and sending, by the OLT, a changed MA to the ONU in which the MEP corresponding to the MA that changes exists, so that the ONU in which the MEP corresponding to the MA that changes exists uses the changed MA as a local MA.

3. The method according to claim 1, wherein after the sending, by the OLT, a configuration message to the ONU to which an MEP belongs, the method further comprises:
when the MEP VLAN of the MEP changes, sending, by the OLT, a changed MEP to the ONU to which the MEP belongs, so that the ONU to which the MEP belongs uses the changed MEP VLAN as a packet forwarding VLAN.

4. A method for setting a maintenance association (MA), comprising:
when a maintenance association (MA) is configured on an optical line terminal (OLT) and no optical network unit (ONU) managed by the MA is configured on the OLT, sending, by the OLT, an MA configuration message to an ONU connected to the OLT, wherein the MA configuration message carries an MA whose MA VLAN has an invalid value, so that the ONU receiving the MA configuration message uses the MA as a local MA; and
when a maintenance association end point (MEP) that corresponds to the MA and that comprises an MEP virtual local area network VLAN and an ONU to which the MEP belongs are configured on the OLT, sending, by the OLT, an MEP configuration message to the ONU to which the MEP belongs, wherein the MEP configuration message carries an MEP whose MEP VLAN has a valid value, so that the ONU to which the MEP belongs uses the MEP VLAN in the MEP configuration message as a packet forwarding VLAN.

5. The method according to claim 4, wherein after the sending, by the OLT, an MEP configuration message to the ONU to which the MEP belongs, the method further comprises:
when the MA changes, sending, by the OLT, a changed MA to the ONU connected to the OLT, so that the ONU receiving a changed MA uses the changed MA as a local MA.

6. The method according to claim 4, wherein after the sending, by the OLT, an MEP configuration message to the ONU to which the MEP belongs, the method further comprises:
when the MEP VLAN of the MEP changes, sending, by the OLT, a changed MEP VLAN to the ONU to which the MEP belongs, so that the ONU to which the MEP belongs uses the changed MEP VLAN as a packet forwarding VLAN.

7. An optical line terminal (OLT), wherein the OLT comprises:
a storage unit, configured to store a correspondence between an MA and a maintenance association end point (MEP) and a correspondence between the MEP and an optical network unit (ONU), wherein the MA comprises an MA virtual local area network VLAN, and the MEP comprises an MEP VLAN; and
a data transmitter, configured to send a configuration message to the ONU to which an MEP belongs, wherein the configuration message carries an MEP whose MEP VLAN has a valid value and an MA whose MA VLAN has an invalid value, so that the ONU to which the MEP belongs uses the MA in the configuration message as a local MA, and uses the MEP VLAN in the configuration message as a packet forwarding VLAN.

8. The OLT according to claim 7, wherein the OLT further comprises:
a processor, configured to: when the MA changes, determine whether an MEP corresponding to the MA that changes exists in an ONU connected to the OLT, and send a changed MA to the ONU in which the MEP corresponding to the MA that changes exists, so that the ONU in which the MEP corresponding to the MA that changes exists uses the changed MA as a local MA.

9. The OLT according to claim 7, wherein the OLT further comprises:
a processor, configured to: when the MEP VLAN of the MEP changes, send a changed MEP VLAN to the ONU to which the MEP belongs, the ONU to which the MEP belongs uses the changed MEP VLAN as a packet forwarding VLAN.

10. An optical line terminal (OLT), wherein the OLT comprises:
a first configuring unit, configured to configure a maintenance association (MA) and configure no optical network unit (ONU) managed by the MA, wherein the MA comprises an MA virtual local area network VLAN, and the MA VLAN has an invalid value;
a first data transmitter, configured to send an MA configuration message to an ONU connected to the OLT, wherein the MA configuration message carries an MA whose MA VLAN has an invalid value, so that the ONU receiving the MA configuration message uses the MA as a local MA;
a second configuring unit, configured to configure a maintenance association end point (MEP) corresponding to the MA, and configure an ONU to which the MEP belongs, wherein the MEP comprises an MEP virtual local area network VLAN; and
a second data transmitter, configured to send an MEP configuration message to the ONU to which the MEP belongs, wherein the MEP configuration message carries an MEP whose MEP VLAN has a valid value, so that the ONU to which the MEP belongs uses the MEP VLAN in the MEP configuration message as a packet forwarding VLAN.

11. The OLT according to claim 10, wherein the OLT further comprises:
a processor, configured to: when the MA changes, send a changed MA to the ONU connected to the OLT, so that the ONU receiving the changed MA uses the changed MA as a local MA.

12. The OLT according to claim 10, wherein the OLT further comprises:
a processor, configured to: when the MEP VLAN of the MEP changes, send a changed MEP VLAN to the ONU to which the MEP belongs, the ONU to which the MEP belongs uses the changed MEP VLAN as a packet forwarding VLAN.

13. An optical network unit (ONU), wherein the ONU comprises:
a receiver, configured to receive a configuration message sent by an optical line terminal (OLT), wherein the configuration message carries an MA whose maintenance association (MA) virtual local area network VLAN has an invalid value and a maintenance association end point (MEP) whose MEP VLAN has a valid value;
a processor, configured to use the MEP VLAN in the configuration message as a packet forwarding VLAN, and perform calculation for the MEP VLAN according to a VLAN translation rule to obtain a translated packet forwarding VLAN; and a forwarder, configured to use the packet forwarding VLAN and the translated packet forwarding VLAN to forward a packet.

14. A system for setting a maintenance association (MA), comprising: an optical line terminal (OLT) and an optical network unit (ONU), wherein a correspondence between an MA and a maintenance association end point (MEP) and a correspondence between the MEP and the ONU are set on the OLT, the MA comprises an MA virtual local area network VLAN, and the MEP comprises an MEP VLAN, wherein the OLT is configured to send a configuration message to the ONU to which an MEP belongs, wherein the configuration message carries an MEP whose MEP VLAN has a valid value and an MA whose MA VLAN has an invalid value; and the ONU is configured to use the MA in the configuration message as a local MA, and use the MEP VLAN in the configuration message as a packet forwarding VLAN.

15. The system according to claim 14, wherein the OLT is further configured to: when the MA changes, determine whether an MEP corresponding to the MA that changes exists in an ONU connected to the OLT, and send a changed MA to the ONU in which the MEP corresponding to the MA that changes exists; and the ONU is further configured to use the changed MA as a local MA.

16. The system according to claim 14, wherein the OLT is further configured to: when the MEP VLAN of the MEP changes, send a changed MEP VLAN to the ONU to which the MEP belongs; and the ONU is further configured to use the changed MEP VLAN as a packet forwarding VLAN.

17. The system according to claim 14, wherein the ONU is further configured to perform calculation for the MEP VLAN according to a VLAN translation rule to obtain a translated VLAN, and when VLAN translation occurs, use the obtained translated VLAN as a packet forwarding VLAN.

* * * * *